United States Patent Office 3,423,876
Patented Jan. 28, 1969

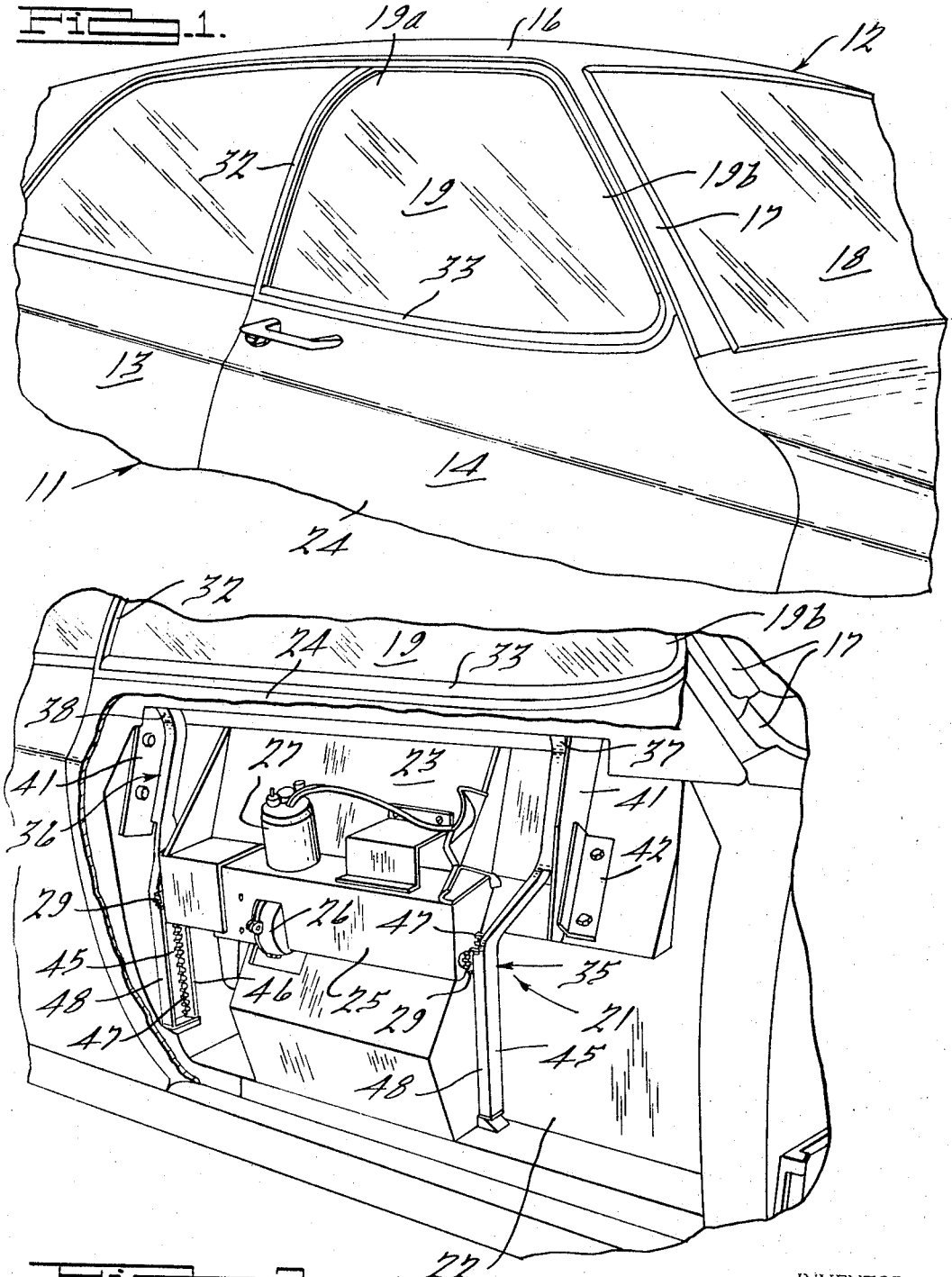

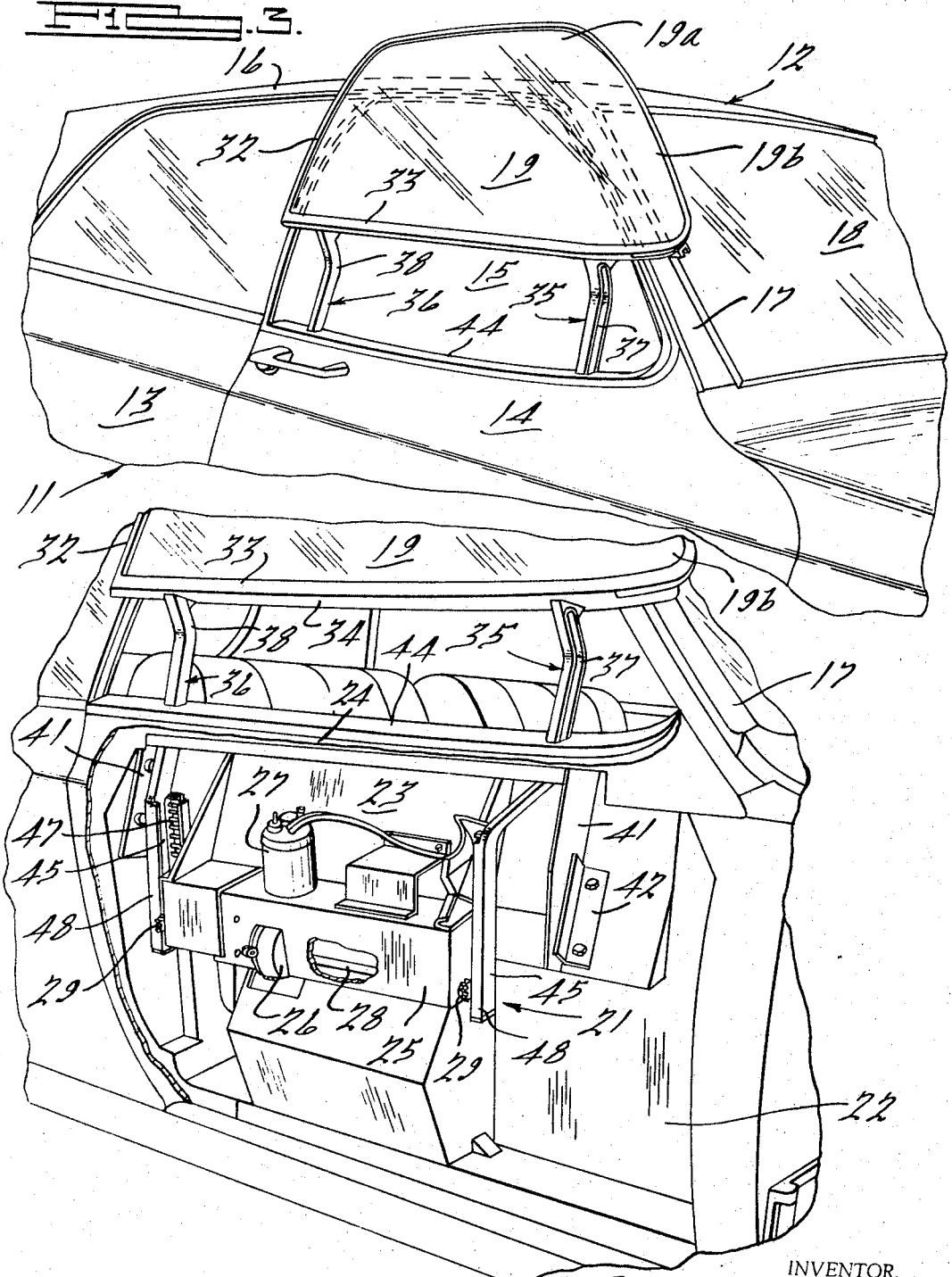

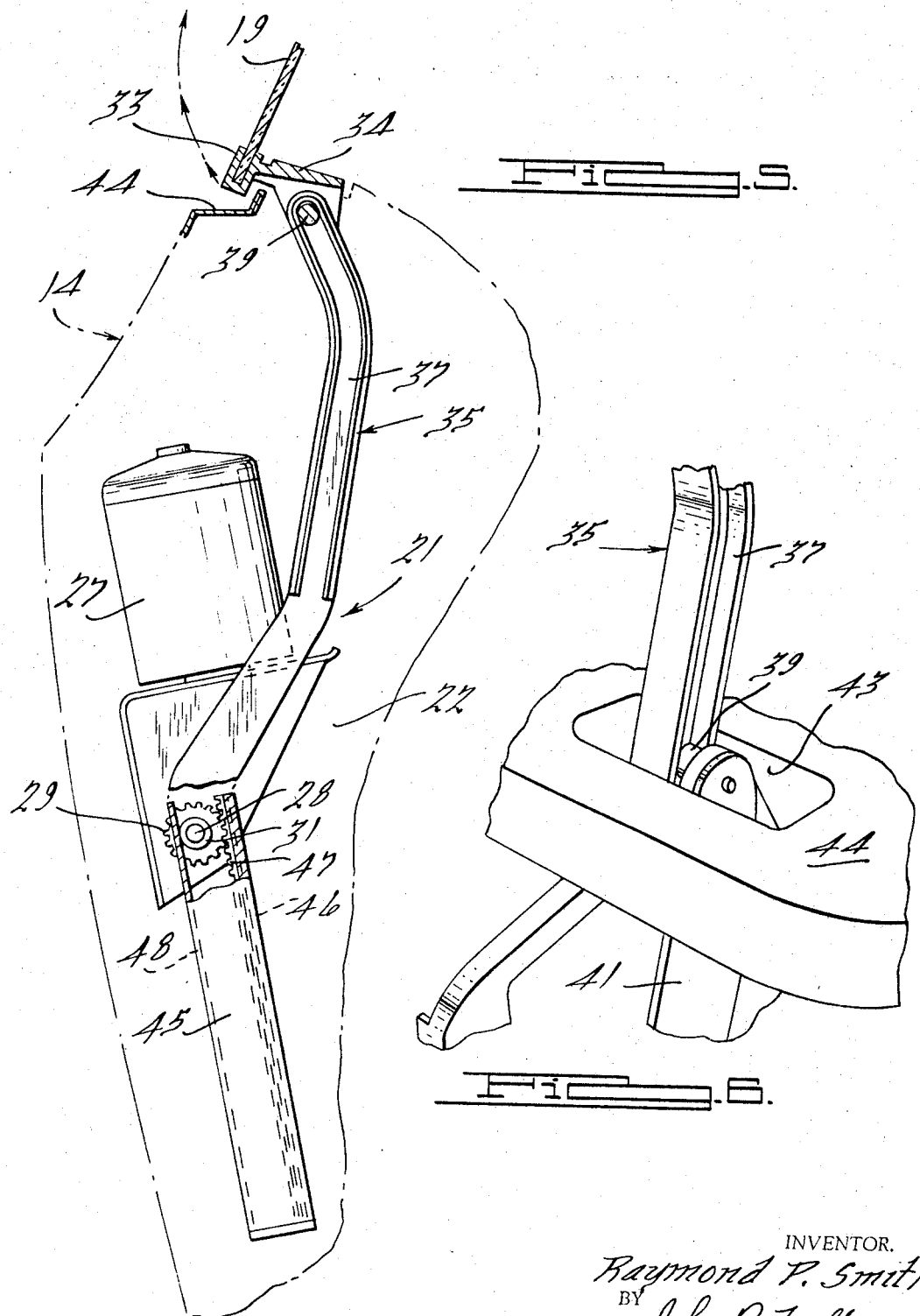

3,423,876
WINDOW REGULATOR MECHANISM
Raymond P. Smith, Southfield, Mich., assignor to Ford Motor Company, Dearborn, Mich., a corporation of Delaware
Filed Nov. 8, 1967, Ser. No. 681,466
U.S. Cl. 49—227                         6 Claims
Int. Cl. E05f 11/52, 15/08, 15/16

ABSTRACT OF THE DISCLOSURE

A window regulator mechanism for bodily shifting, with combined lateral and vertical movement, a window panel into or out of a window opening in a structure, such as a vehicle body structure comprising a door or body panel.

Background of the invention

Automotive body designers have long sought freedom of design expression in the window glass areas of the vehicle body. Because it has been considered necessary to make provision for the raising and lowering of the side windows of the vehicle body, only limited contour deviations from the usual substantially flat plane of the window could be accommodated. Recent improvement in air conditioning, heating and ventilation of vehicle bodies has encouraged a trend toward the elimination of conventional movable glass panels in the doors and side panels of vehicle bodies. This trend has been evidenced by the recent elimination of the pivoted ventilation windows in some body styles. The next step would seem to be the provision of fixed windows in the doors and side panels. This would remove all restrictions on glass contours so that the latter could be fully blended into any desired body configuration.

There are, however, at least two restrictions that prevent total use of fixed windows. One is that some vehicle occupants are susceptible to claustrophobia when riding in a completely closed vehicle. Another is that the vehicle operator occasionally must be able to reach through a window opening to pay tolls, sign credit slips for fuel or be prepared in emergencies to use hand signals to indicate a change in direction of speed.

It is an object of the present invention to provide a vehicle window which is movably supported on a vehicle body in a manner that substantially eliminates all restrictions on the contour of the glass panel.

Summary of the invention

This invention relates to a window regulator mechanism for positioning a window panel relative to a window opening in a vehicle body structure, such as a door or body panel, having a mechanism receiving cavity subjacent the window opening. The window regulator mechanism is housed within the body structure cavity and comprises a plurality of vertically extending support members connected to the window panel. The body structure is provided with guide means within said cavity for guiding the upper portions of said support members for movement into and out of the body structure cavity. Power means are supported within the body structure cavity and are coupled to the support members to raise and lower the latter. Upon the support members being raised, their upper portions are extended from within the body structure cavity and the window panel is bodily shifted with combined lateral and vertical movement out of the window opening. Upon the support members being lowered, the upper portions are retracted into the body structure cavity and the window panels are bodily shifted with combined lateral and vertical movement into the window opening.

Description of the drawing

Other objects, advantages and features of the present invention will become more apparent as this description proceeds reference being had to the accompanying drawings, wherein:

FIG. 1 is a fragmentary perspective view of a vehicle body illustrating a contoured window panel mounted on a vehicle body;

FIG. 2 is a fragmentary perspective view illustrating the orientation of a window regulator mechanism for opening and closing the window of FIG. 1, the mechanism being shown in window closed position;

FIG. 3 is a view in part similar to FIG. 1 illustrating the contoured window in a raised and laterally displaced open position;

FIG. 4 is a view in part similar to FIG. 2 illustrating the window regulator mechanism after it has been operated to move the window from the FIG. 1 to the FIG. 3 position;

FIG. 5 is an enlarged end elevation, in part sectional, of the window regulator mechanism; and FIG. 6 is an enlarged fragmentary view illustrating the relationship of the guide means mounted within the vehicle body structure and a portion of a track of a support member supporting the window panel for its movement.

Description of the invention

Referring now to the drawings, there is illustrated a portion of a vehicle body, generally designated 11, having an upper body portion 12 emphasizing rounded contours to a much greater degree than has been used in high volume production vehicles. The side of the vericle body 11 shown in the drawing has a body side panel 13 including a door 14 the upper portion of which is framed to provide a window opening 15. It will be understood that the opposite side of the vehicle normally will be symmetrical to the side shown.

The upper portion of the door 14 is contoured so that it curves inwardly into the area of the body roof panel 16 and also curves inwardly into the forward end toward the pillar 17 framing one side of the windshield 18. To fit these conditions, the window panel 19 must also have an equivalent compound curvature. That is, the upper portion 19a must curve toward the center of the roof panel 16 and the forward portion 19b must curve from the plane of the vehicle body side panel 13 around the front corner toward the pillar 17.

In conventional vehicle body construction, the window panel in the door or body side panel is relatively flat or moderately curved about a single axis of revolution. Window regulator mechanisms easily may be designed to raise and lower such window panels out of or into a window well subjacent the window opening beneath the inner and outer panels of the door. A window, such as the window 19 with its compound curvature, cannot be accommodated in the conventional manner. Accordingly, the window regulator mechanism, generally designated 21 embodying the present invention is not operable to move the window panel 19 into and out of a window well subjacent the window opening 15. Instead, the mechanism 21 is constructed and arranged to bodily shift the window panel 19 out of the window opening 15, as will now be described.

The window regulator mechanism 21 is housed in a cavity 22 within the inner panel 23 and the outer panel 24 of the door 14. This cavity 22 corresponds to the window well of a conventional vehicle door structure, although it is not used to store the window panel in window open condition. Within the cavity 22 a bracket 25 is housed. The bracket 25 partially encases a reduction gear unit 26 coupled to a reversible electric motor 27.

The reduction gear unit 26 drives a shaft 28 extending longitudinally of the door 14. The shaft 28 is coupled intermediate its ends to the reduction gear unit 26 and at each end it carries a pinion 29. Each pinion has a reduced diameter portion 31 which functions as a roller as will be more fully explained.

The window panel 19 is encased in a peripheral frame 32 having along its bottom frame section 33 an inwardly extending bracket portion 34 to which is rigidly secured a plurality of substantially vertically extending support members 35 and 36. The upper portions 37 and 38 of the support members 35 and 36 are channel shaped so as to form guide tracks receiving fixed guide means, such as the roller 39 (see FIG. 6). Each roller 39 is mounted on a support arm 41 secured to a suitable bracket 42 bolted into the door structure 14. As best seen in FIG. 6, the upper ends of the support members 35 and 36 project through apertures, such as the aperture 43 in the sill 44 of the window opening 15.

The upper portions 37 and 38 of the support members are nonlinear or curvilinear, as best seen in FIG. 5, so that the window panel 19 will be bodily shifted in a predetermined path relative to the window opening upon the support members 35 and 36 being raised or lowered.

At its lower end each support member 35 and 36 has a linear channeled shape section 45 one side wall 46 of which supports a rack 47. Each rack 47 is in mesh with a pinion 29. The opposite side wall 48 of each channel section is in bearing engagement with the roller portion 41 of each pinion 29.

Operation of the mechanism

When it is desired to move the window panel 19 from the closed position shown in FIG. 1 to the opened position shown in FIG. 3, the operation of a suitable switch (not shown) energizes the motor 27 to set the mechanism in motion. The motor 27 drives the pinions 29 through the reduction gearing 26 and shaft 28 in a direction, counterclockwise as viewed in FIG. 5, to cause the support members 35 and 36 to be raised. Because of the nonlinear or curvilinear upper track portions 37 and 38 on the support members 35 and 36, the rollers or guides 39 engaged with the track portions 37 and 38 cause the latter to move in a direction to bodily shift the window panel 19 laterally away from the window frame of the door 14 while at the same time raising the window panel 19. Depending upon the amount of curvature in the track portions 37 and 38, the degree to which the window panel 19 is shifted laterally outwardly is predetermined and should be sufficient so that when the end of the curved portion of the track is reached the movement of the window will be in a substantially upward direction. It will be understood that the support members 35 and 36 will rock in a lateral plane above the axis of the roller portions 31 of the pinions 29. This, of course, has no effect on the interaction between the pinions 29 and the rack portion 47 of the lower sections of the support members 35 and 36.

If the window panel 19 is in the opened position of FIG. 3 and it is desired to close the window, it is only necessary to reverse the direction of the motor 27 so that the pinions 29 rotate in the opposite direction, a clockwise direction as viewed in FIG. 5, to drive the support members 35 and 36 downwardly. The movement of the window will be in a substantially straight down position until the curved section of the tracks 37 and 38 are reached at which time the window will be moved laterally into the window opening.

As seen in FIG. 3 the window panel 19 is raised sufficiently to provide for a substantial amount of air flow therethrough. The window panel 19 as it is raised will not interfere with the passage of the vehicle occupant's arm through the window for purposes such as paying tolls, signing fuel credit slips or for any necessary hand signals that may be required during the operation of the vehicle.

It is to be understood that this invention is not limited to the exact construction illustrated and described above or in the abstract preceding the specification, but that various changes and modifications may be made without departing from the spirit and scope of the invention as defined in the appended claims.

I claim:
1. A window regulator mechanism for positioning a window panel relative to a window opening in a vehicle body structure, such as a door or body panel, having a mechanism receiving cavity subjacent the window opening,
    said window regulator mechanism being housed within said body structure cavity and comprising:
        a plurality of vertically extending support members connected to the window panel,
        guide means on said body structure within said cavity guiding the upper portion of said support members for movement into and out of said body structure cavity,
        power means supported within said body structure cavity and coupled to said support members to raise and lower the latter,
        said support members upon being raised having their upper portions extending from within said body structure cavity to bodily shift the window panel with combined lateral and vertical movement out of the window opening,
        and said support members upon being lowered having their upper portions retracted into said body structure cavity to bodily shift the window panel with combined lateral and vertical movement into the window opening.
2. A window regulator mechanism according to claim 1 in which:
    each support member has as its upper end a nonlinear track portion engaged with the guide means on the body structure.
3. A window regulator mechanism according to claim 2 in which:
    each support member has as its lower end a linear rack portion,
    the power means including pinion means engaged with the rack portion.
4. A window regulator mechanism according to claim 1 in which:
    each support member has at its upper end a curvilinear track portion engaged with the guide means on the body portion,
    each support member has at its lower end a linear rack portion,
    and the power means includes pinion means engaged with the rack portion.
5. A window regulator mechanism for positioning a window panel relative to a window opening in a vehicle body structure, such as a door or body panel, having a mechanism receiving cavity subjacent the window opening,
    said window regulator mechanism being housed within said body structure cavity and comprising:
        a pair of substantially vertically extending support members rigidly connected to the window panel at the lower edge thereof,
        guide means fixed within said body structure,
        each support member having a nonlinear track portion extending from the connection at the window panel to a point intermediate the ends thereof and engaged with a guide means,
        said nonlinear track portions being contoured to coact with the respective guide means engaging the track portions to bodily shift the window with a predetermined nonlinear motion to an open position laterally displaced outwardly of and raised from the lower edge of said window opening upon said support members being raised, and power means supported within said body structure and coupled to said support members to raise and lower the latter.

6. A window regulator mechanism according to claim 5 in which:

the lower end of each vertically extending support member comprises a rack portion, said power means including pinions engageable with the respective rack portions, said pinions being rotatable about a fixed axis for driving said rack portions and thereby said support members in support member raising or lowering direction.

References Cited

UNITED STATES PATENTS

| | | | |
|---|---|---|---|
| 1,916,865 | 7/1933 | Nicholson | 49—375 X |
| 3,374,972 | 3/1968 | Webb | 49—349 X |

FOREIGN PATENTS

| | | |
|---|---|---|
| 1,263,183 | 4/1961 | France. |
| 623,727 | 1/1936 | Germany. |
| 830,723 | 3/1960 | Great Britain. |

DAVID J. WILLIAMOWSKY, *Primary Examiner.*

J. KARL BELL, *Assistant Examiner.*

U.S. Cl. X.R.

49—349, 375